(12) United States Patent
Furukawa et al.

(10) Patent No.: US 7,058,977 B1
(45) Date of Patent: Jun. 6, 2006

(54) COPYRIGHT CONTROL OF ENCRYPTED DATA USING UNCORRECTED ERRORS IN AN ERROR CORRECTING CODE

(75) Inventors: Shunsuke Furukawa, Tokyo (JP); Yoichiro Sako, Tokyo (JP)

(73) Assignee: Sony Corporation (JP)

( * ) Notice: Subject to any disclaimer, the term of this patent is extended or adjusted under 35 U.S.C. 154(b) by 675 days.

(21) Appl. No.: 09/638,164

(22) Filed: Aug. 14, 2000

(30) Foreign Application Priority Data

Aug. 18, 1999 (JP) .................................. 11-231289

(51) Int. Cl.
*H04L 9/32* (2006.01)
*G06F 11/30* (2006.01)
*G06F 12/14* (2006.01)
*H04N 7/167* (2006.01)
*G11B 7/00* (2006.01)

(52) U.S. Cl. ........................ 726/26; 713/193; 380/201; 705/57; 369/53.21

(58) Field of Classification Search ................ 713/200, 713/193; 380/201; 705/57; 369/53.21; 726/26, 31
See application file for complete search history.

(56) References Cited

U.S. PATENT DOCUMENTS

| 5,646,993 A * | 7/1997 | Aizawa ........................ 705/57 |
| 5,737,286 A * | 4/1998 | Timmermans et al. ... 369/44.13 |
| 5,917,910 A * | 6/1999 | Ishiguro et al. ................ 705/57 |
| 6,081,785 A * | 6/2000 | Oshima et al. ................. 705/1 |
| 6,320,829 B1 * | 11/2001 | Matsumoto et al. ..... 369/47.12 |
| 6,532,201 B1 * | 3/2003 | Hogan ...................... 369/53.21 |
| 6,590,846 B1 * | 7/2003 | Tosaki et al. ............. 369/53.21 |
| 6,718,501 B1 * | 4/2004 | Brody et al. ................. 714/752 |
| 2002/0159357 A1 | 10/2002 | Tosaki et al. ............. 369/53.21 |

FOREIGN PATENT DOCUMENTS

| EP | 0802535 | 10/1997 |
| WO | WO 97/50081 | 12/1997 |
| WO | WO 200115028 A1 * | 3/2001 |
| WO | WO 200141130 A2 * | 6/2001 |

OTHER PUBLICATIONS

Peck, Frances. "Misplaced and Dangling Modifiers", HyperGrammar. University of Ottawa, 1996. www.uottawa.ca/academic/arts/writcent/hypergrammar/msplmod.html [Retrieved Apr. 16, 2005.] 4 pages.*

Bloom, Jeffrey et al. "Copy Protection for DVD Video". Proceedings of the IEEE, vol. 87, No. 7. Jul. 1999. pp. 1267-1276.*

* cited by examiner

*Primary Examiner*—Matthew Smithers
*Assistant Examiner*—Zachary Davis
(74) *Attorney, Agent, or Firm*—Lerner, David, Littenberg, Krumholz & Mentlik, LLP

(57) ABSTRACT

A data storing medium has a digital data area in which encrypted digital data or non-encrypted digital data is written, a control data area in which control data necessary for reproducing recorded digital data is written, and a copyright control information area in which copyright control information necessary for decrypting encrypted digital data is written, wherein the copyright control information area is write-prohibited, and wherein the control data area is write-permitted.

22 Claims, 7 Drawing Sheets

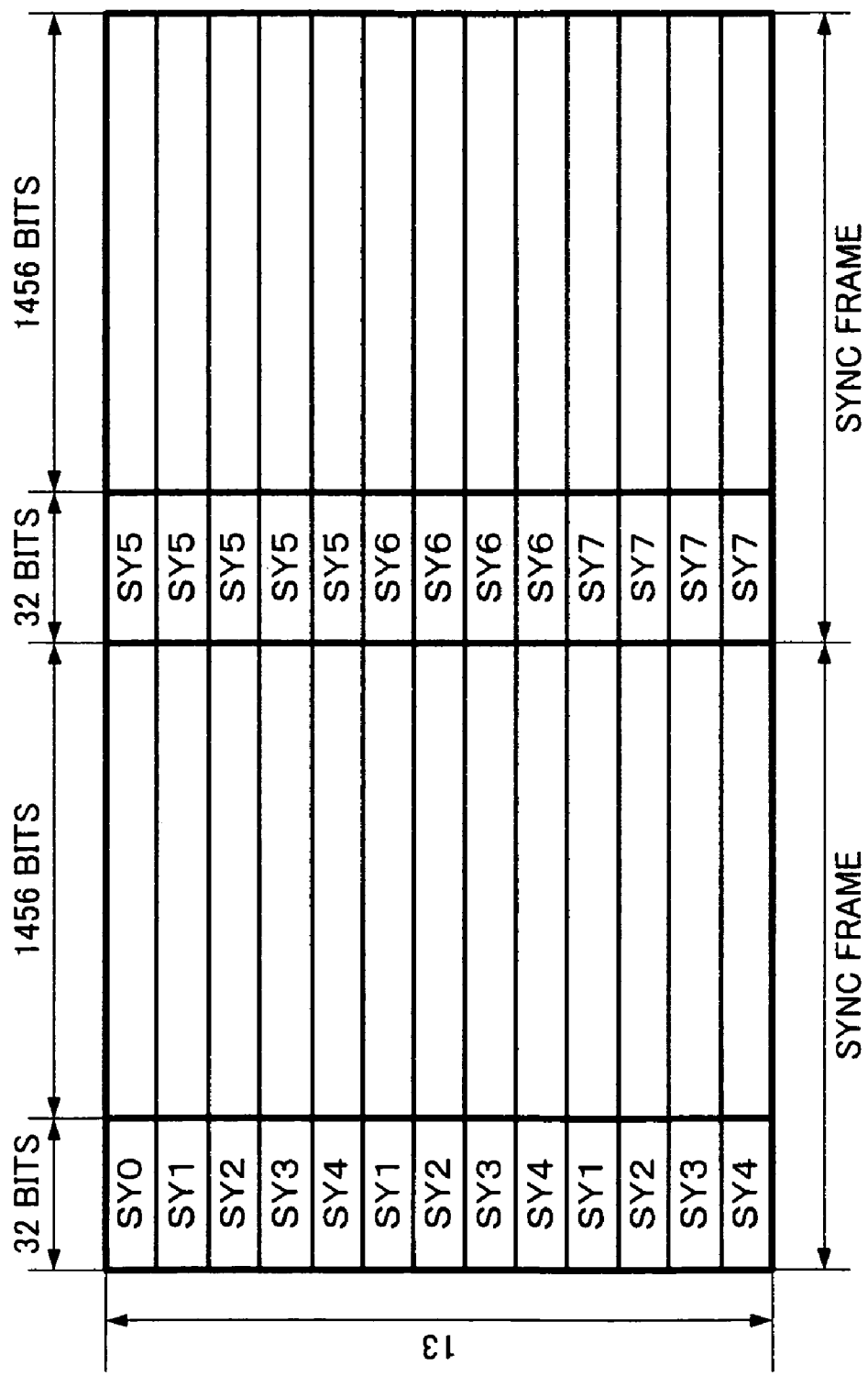

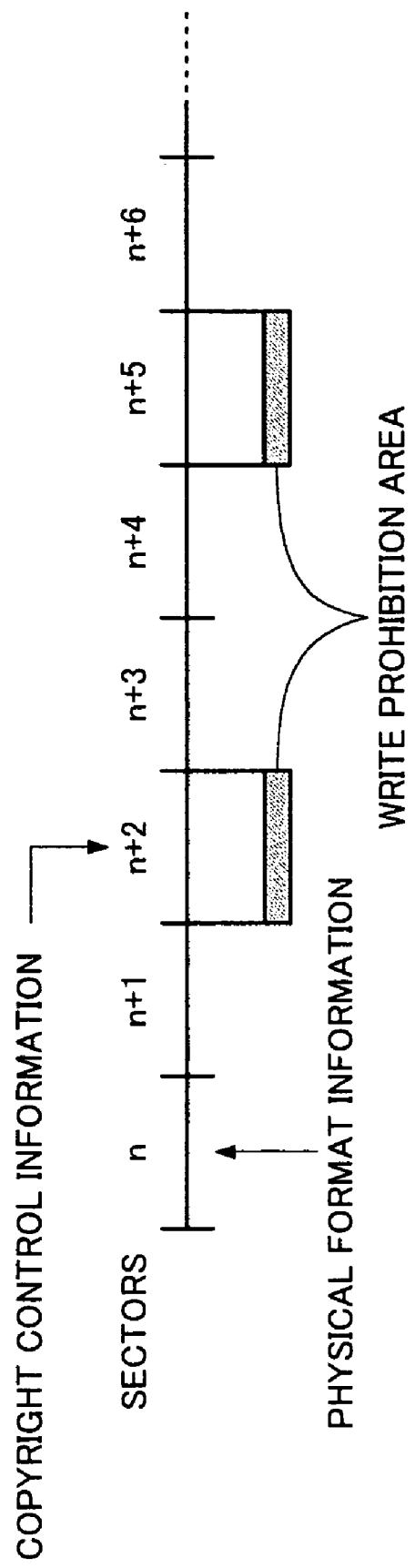

US 7,058,977 B1

COPYRIGHT CONTROL OF ENCRYPTED DATA USING UNCORRECTED ERRORS IN AN ERROR CORRECTING CODE

BACKGROUND OF THE INVENTION

1. Field of the Invention

The present invention relates to a data storing medium, a data recording apparatus, a data recording method, a data reproducing apparatus, a data reproducing method, a data writing method for a storing medium, a data writing apparatus for a data storing medium, and a data reproducing method for a data storing medium. In particular, the present invention relates to a data storing medium for digital data, a data recording apparatus, a data recording method, a data reproducing apparatus, a data reproducing method, a data writing method for a data storing medium, a data writing apparatus for a data storing medium, and a data reproducing method for a data storing medium.

2. Description of the Related Art

In recent years, as large storage storing media, a DVD (Digital Versatile Disc or Digital Video Disc) video disc and a DVD-ROM disc that are optical discs are becoming common. In addition, a direct-read-after-write optical disc (hereinafter referred to as DVD-R (Rewritable) disc) and a rewritable DVD disc (hereinafter referred to as DVD-RW disc) that have the same storage capacity as a DVD video disc (4.7 GB per side) will be placed on the market in the near future.

In a DVD video disc and a DVD-ROM disc, data is recorded as pits formed thereon. In the case of a DVD-R disc, when a record laser beam is radiated to a dye film formed thereon, it is heated and denatured. As a result, a light absorption characteristic varies. Thus, when data is reproduced from the recorded portion, the reflectance thereof varies. On the other hand, a DVD-RW disc is a phase-change-type optical disc using a record film on which data is recorded. In the DVD-RW, when the record film is heated with a high power laser beam, the record film becomes an amorphous state in which reflectance is low. When the record film of the DVD-RW is heated with a low power laser beam, the record film is restored to the original crystal state in which reflectance is high. Thus, although the data recording methods differ in a DVD-ROM disc and a DVD-RW disc, their data reproducing methods are the same in that data is reproduced corresponding to the variation of the amount of reflected light of the laser beam.

Thus, in a DVD-R disc and a DVD-RW disc, data can be reproduced therefrom with a DVD video player. This characteristic will result in an illegal copy of data recorded thereon. Most of DVD video software titles that are placed on the market are copy-prohibited software titles. When a copy prohibition bit of such a disc is turned on, the copy of the data is prohibited from being copied so as to protect the copyright of the data. However, if an illegal process is performed (for example, the copy prohibition bit is skipped), data recorded on a copy-prohibited disc can be copied.

In addition, in the case of a DVD video disc, a copy-prohibited video software title such as a movie is encrypted corresponding to a particular method such as CSS (Contents Scramble System). In other words, only an authorized software maker can produce software titles. In addition, only an authorized hardware device can reproduce such a software title. To decrypt encrypted data, copyright control information such as a key is recorded in a predetermined area of a DVD video disc.

When encrypted data cannot be decrypted, the copyright of a software title can be protected against such an illegal process (for example, the copy prohibition bit is skipped). However, when the copyright control information is copied along with encrypted data, since the encrypted data can be decrypted, the copyright of the software title cannot be protected. As a method for protecting the copyright control information from being copied, an area for a block that contains the copyright control information of a recordable disc, a DVD-RW disc, and a DVD-R disc may be record-prohibited. In other words, when an (n+2)-th sector is an area to which the copyright control information is written, as shown in FIG. 1, an area to which an error correction block containing the (n+2)-th sector is written is embossed. Thus, when the area is embossed, the copyright control information cannot be recorded. Since the entire block is embossed, the copyright control information cannot be decrypted with error correction code.

However, in the method shown in FIG. 1, since error data succeeds, reproduced data cannot be synchronized (frames cannot be synchronized). Thus, an abnormal process may take place (for example, the reproducing operation may stop). In addition, control data that is required to reproduce contents data may not be reproduced. Thus, the contents data cannot be reproduced from the disc with a conventional DVD video player. Thus, even if encoded data cannot be reproduced for copyright protection, data that is not copyright-protected and that has not been encrypted (for example, a broadcast program, a picture photographed by a video camera, and so forth) cannot be reproduced from a DVD-RW disc and a DVD-R disc with a DVD video player. The absence of the reproduction compatibility causes the usability of a DVD-RW disc and a DVD-R disc to deteriorate.

OBJECTS AND SUMMARY OF THE INVENTION

It is therefore a first object of the present invention to provide a data storing medium that solves the above-mentioned problem.

It is a second object of the present invention to provide a data recording apparatus that solves the above-mentioned problem.

It is a third object of the present invention to provide a data recording method that solves the above-mentioned problem.

It is a fourth object of the present invention to provide a data reproducing apparatus that solves the above-mentioned problem.

It is a fifth object of the present invention to provide a data reproducing method that solves the above-mentioned problem.

It is a sixth object of the present invention to provide a data writing apparatus for a data storing medium that solves the above-mentioned problem.

It is a seventh object of the present invention to provide a data writing method for a data storing medium that solves the above-mentioned problem.

It is an eighth object of the present invention to provide a data reproducing method for a data storing medium that solves the above-mentioned problem.

A first aspect of the present invention is a data storing medium, comprising a digital data area in which encrypted digital data or non-encrypted digital data is written, a control data area in which control data necessary for reproducing recorded digital data is written, and a copyright control information area in which copyright control information necessary for decrypting encrypted digital data is written, wherein said copyright control information area is write-prohibited, and wherein said control data area is write-permitted.

A second aspect of the present invention is a data recording apparatus for writing encrypted digital data or non-encrypted digital data to a predetermined data storing medium, comprising a means for writing the encrypted digital data and copyright control information necessary for decrypting the encrypted digital data to the data storing medium in such a manner that when the encrypted digital data is reproduced the copyright control information is not obtained.

A third aspect of the present invention is a data recording method for writing encrypted digital data or non-encrypted digital data to a predetermined data storing medium, comprising the step of writing the encrypted digital data and copyright control information necessary for decrypting the encrypted digital data to the data storing medium in such a manner that when the encrypted digital data is reproduced the copyright control information is not obtained.

A fourth aspect of the present invention is a data reproducing apparatus for reproducing data from a data storing medium on which an error correction block containing copyright control information necessary for decrypting encrypted digital data has been written, wherein even if the entire error correction block is not error-corrected, data of the error correction block that does not contain the copyright control information and that does not have an error is reproduced.

A fifth aspect of the present invention is a data reproducing method for reproducing data from a data storing medium on which an error correction block containing copyright control information necessary for decrypting encrypted digital data has been written, wherein even if the entire error correction block is not error-corrected, data of the error correction block that does not contain the copyright control information and that does not have an error is reproduced.

A sixth aspect of the present invention is a data storing medium, comprising a first area in which digital data is written, and a second area in which control data necessary for reproducing the data from said first area is written, said second area having at least a write-prohibited portion.

A seventh aspect of the present invention is a data reproducing method for a data storing medium having a first area in which digital data is written and a second area in which control data necessary for reproducing the data from the first area is written, the second area having at least a write-prohibited portion, the data reproducing method comprising the steps of reading the control data from the second area, and reproducing the digital data from the storing medium corresponding to the control data that has been correctly read.

An eighth aspect of the present invention is a data writing method for a data storing medium having a first area in which digital data is written and a second area in which control data necessary for reproducing the data from the first area is written, the data writing method comprising the step of writing the control data to the second area in such a manner that part of the control data is not reproduced.

A ninth aspect of the present invention is a data writing method for a data storing medium having a first area in which digital data is written and a second area in which different data that is read before the digital data is read when the digital data is reproduced, the data writing method comprising the step of writing the different data to the second area in such a manner that part of the different data is not reproduced.

A tenth aspect of the present invention is a data writing apparatus having a data storing medium having a first area in which digital data is written and a second area in which control data necessary for reproducing the data from the first area is written, the data writing apparatus comprising a writing portion for writing data to the data storing medium, and a data processing portion for supplying data to said writing portion in such a manner that at least part of the control data is reproduction-prohibited.

An eleventh aspect of the present invention is a data writing apparatus for a data storing medium having a first area in which digital data is written and a second area in which different data that is read before the digital data is read from the first area when the digital data is reproduced from the first area, the data writing apparatus comprising a writing portion for writing data to the data storing medium, and a data processing portion for supplying data to said writing portion in such a manner that at least part of the different data is reproduction-prohibited.

A twelfth aspect of the present invention is a data storing medium, comprising a first area in which digital data is written, and a second area in which control data necessary for reproducing the data from said first area is written, said second area having at least a write-prohibited portion.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 7 is a schematic diagram for explaining the data structure of a sector that has been modulated according to the embodiment of the present invention; and FIG. 8 is a schematic diagram for explaining a process for a disc according to the embodiment of the present invention.

DETAILED DESCRIPTION OF THE PREFERRED EMBODIMENTS

Figure 1:
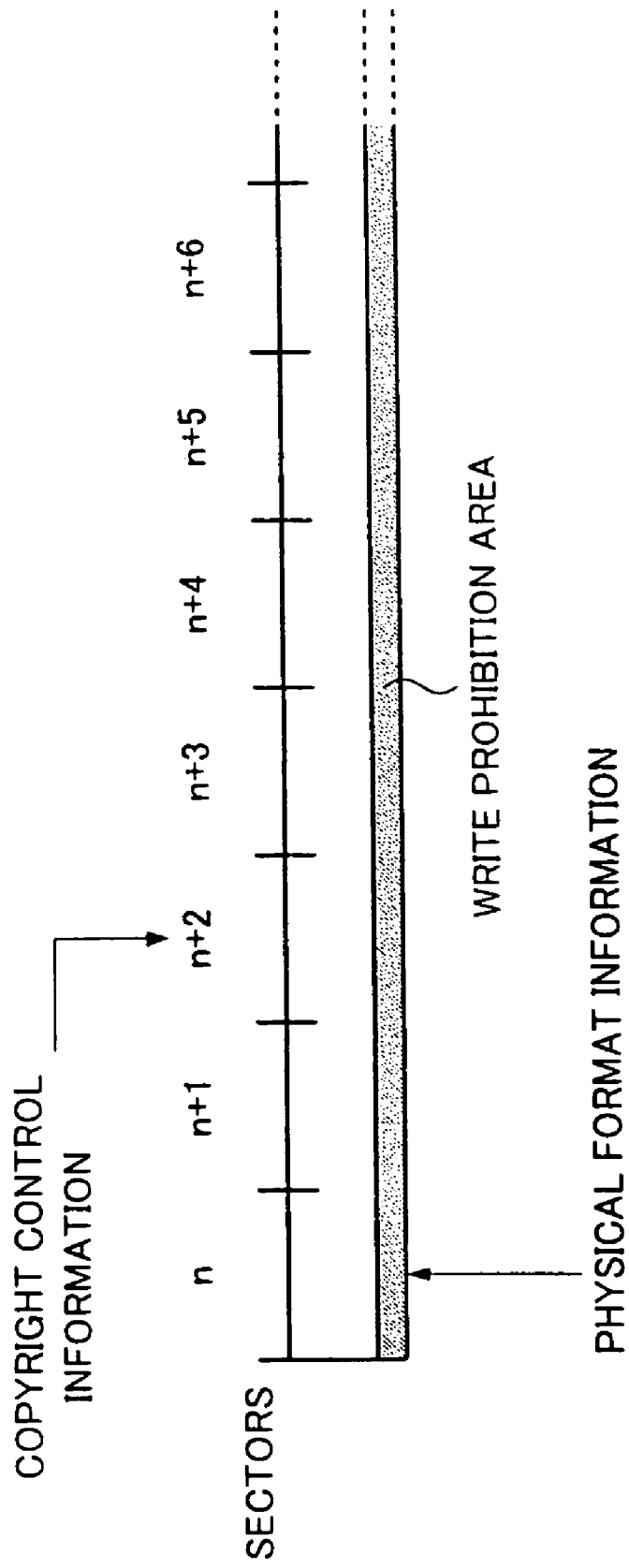
FIG. 1 is a schematic diagram for explaining an example of a process for a disc so as to protect the copyright of contents data recorded thereon.
Figure 2:
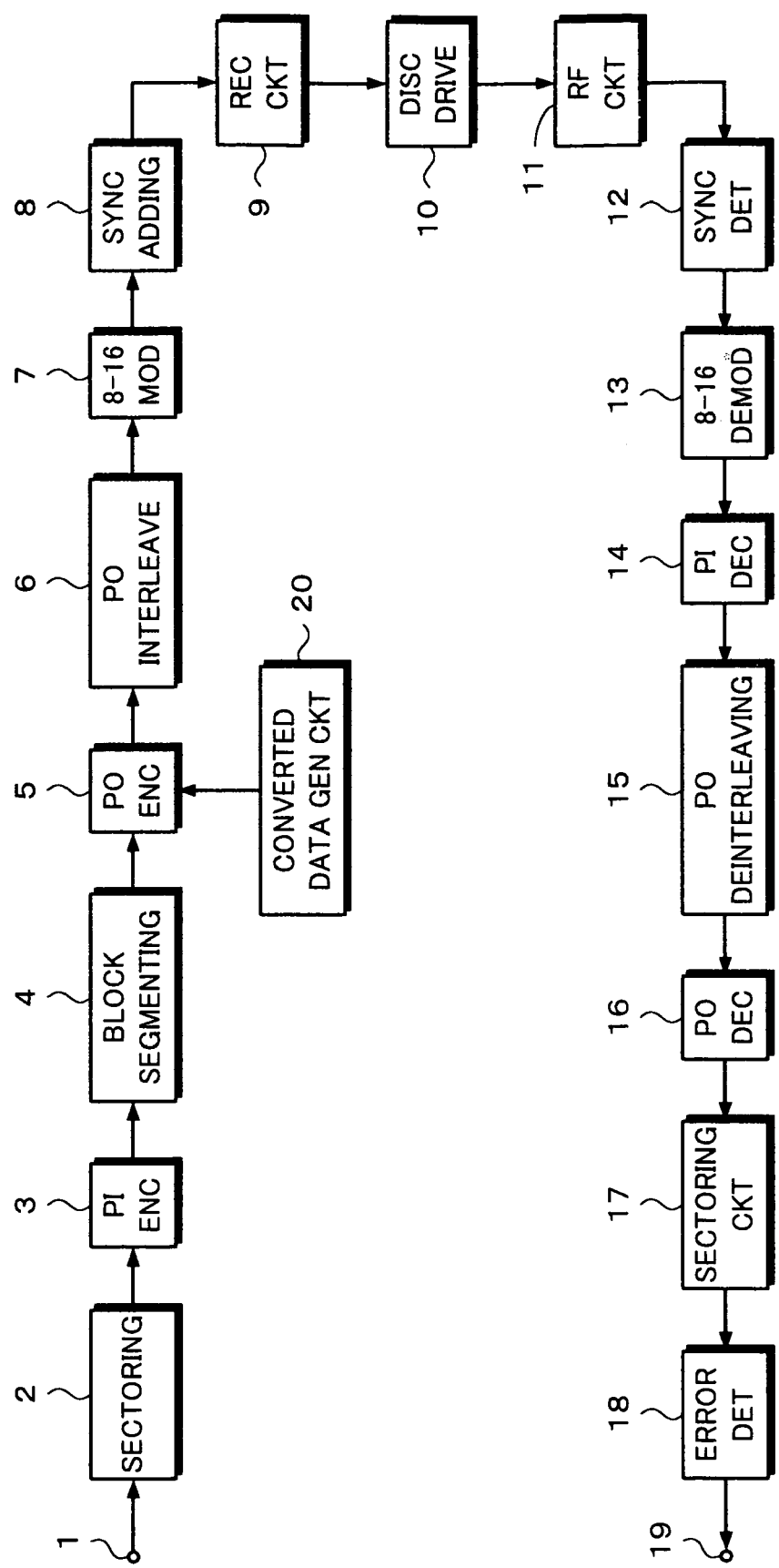
FIG. 2 is a block diagram showing the overall structure of a disc recording and reproducing apparatus according to an embodiment of the present invention.

Next, with reference to the accompanying drawings, an embodiment of the present invention will be described. According to the embodiment of the present invention, as a data recordable optical disc, a DVD-RW disc or a DVD-R disc is used. FIG. 2 shows the structure of a signal processing system of a recorder that uses a recordable optical disc.

In FIG. 2, user data and ID data are supplied from an input terminal 1 to a sectoring circuit 2. The sectoring circuit 2 converts the user data into data of a sector structure shown in FIG. 3. One sector is composed of a data ID (4 bytes), an IED (2 bytes), a reserve area (6 bytes), user data (2048 bytes=2 KB), and an EDC (4 bytes) arranged in the order. The total size of one sector is 2064 bytes. The 2064 bytes are arranged on 12 lines (namely, 174 bytes×12 lines).

The data ID includes an address of a wobbling groove (namely, a track number and a sector number). The IED is an error detection parity for the data ID (for example, CRC). The EDC is an error detection parity for finally checking whether or not the user data that has been been reproduced from the optical disc and error-corrected by for example an error correcting process has an error (for example, CRC).

Figure 3:
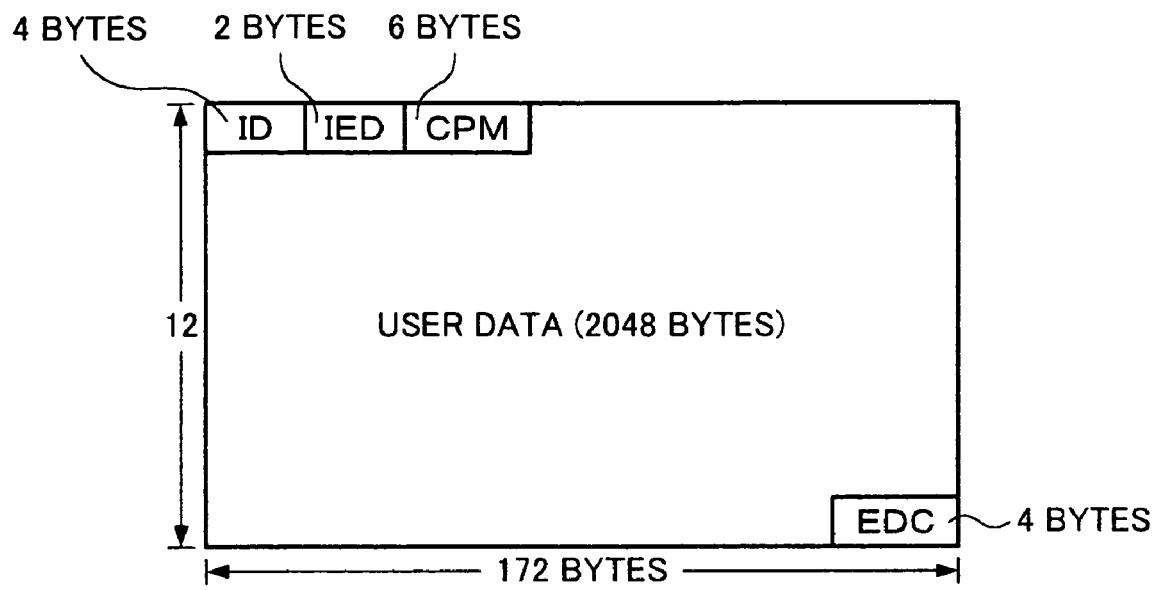
FIG. 3 is a schematic diagram for explaining the data structure of a sector according to the embodiment of the present invention.
Figure 4:
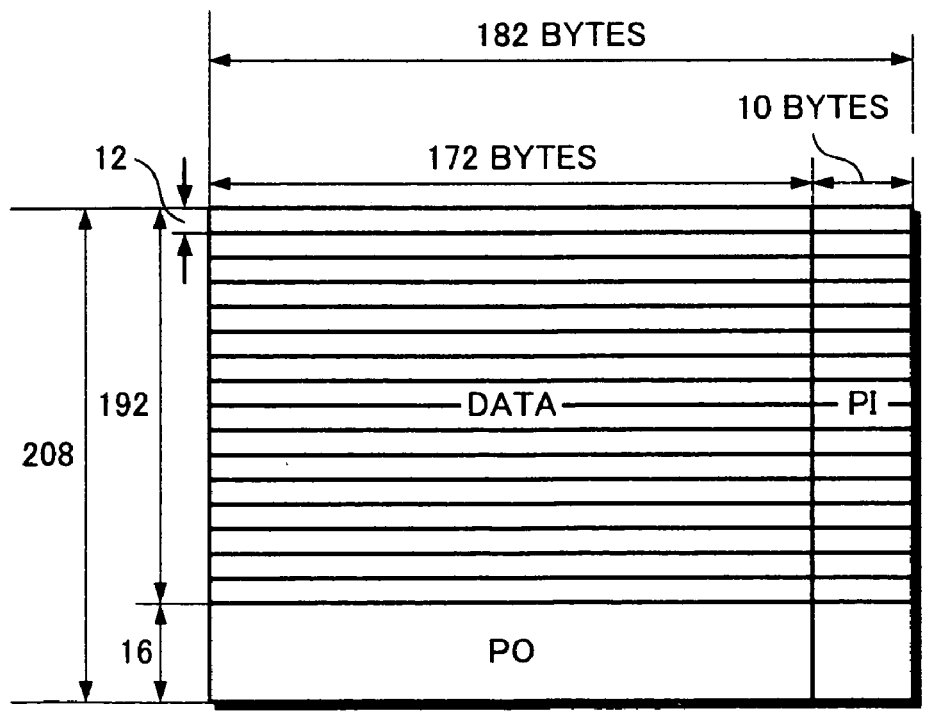
FIG. 4 is a schematic diagram for explaining the data structure of an ECC block according to the embodiment of the present invention.

According to the embodiment, as the error correction code, Reed-Solomon product code is used. With 16 sectors, each of which is composed of 172 bytes×12 as shown in FIG. 3, an ECC block shown in FIG. 4 is formed. In other words, by arranging 16 sectors in the vertical direction, a data array of (172 bytes×192 (=12×16)) is formed. The data of 192×172 bytes is encoded with product code.

Data of each line of 172 bytes is encoded with (182, 172, 11) Reed-Solomon code and thereby inner code parity PI of 10 bytes is generated. In addition, data of each column of 192 bytes is encoded with (208, 192, 17) Reed-Solomon code and thereby outer code parity PO of 16 bytes is generated. Each of these notations of the Reed-Solomon code represents (the code length, the number of information symbols, and the minimum distance).

In FIG. 2, output data of the sectoring circuit 2 is supplied to an inner code encoder 3. The inner code encoder 3 generates parity PI. The data and the parity PI are supplied to a block segmenting circuit 4. Output data of the block segmenting circuit 4 is supplied to an outer code encoder 5. The outer code encoder 5 generates parity PO. The block segmenting circuit 4 changes the arrangement of the data of the ECC block from the line direction shown in FIG. 4 to the column direction. The outer code encoder 5 outputs data that has been encoded with error correction code. A converted data generating circuit 20 is connected to the outer code encoder 5. The detail of the converted data generating circuit 20 will be described later.

Figure 5:
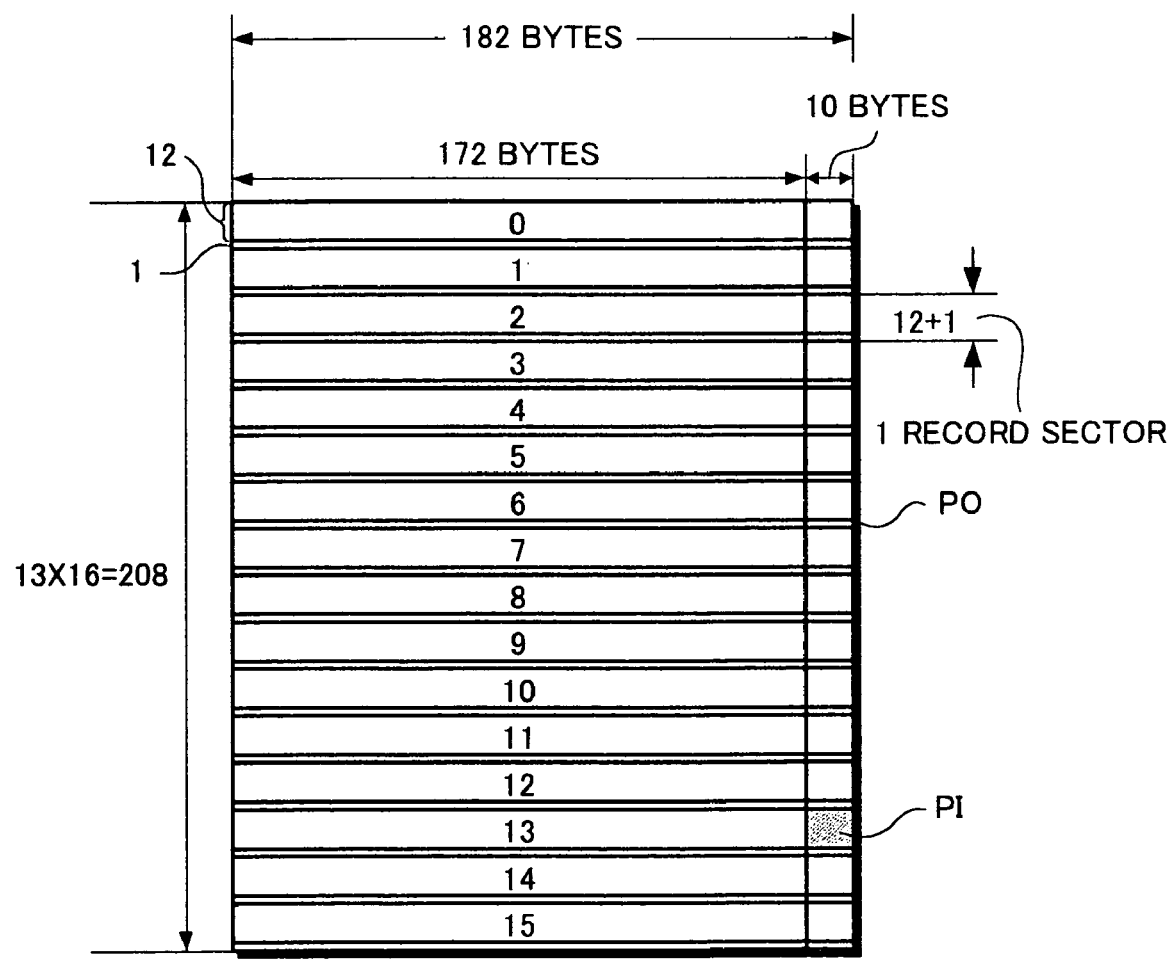
FIG. 5 is a schematic diagram for explaining the data structure of record sectors according to the embodiment of the present invention.

The outer code encoder 5 outputs an ECC block shown in FIG. 4. The outer code parity PO of 182 bytes×16 of the block segmented data of 182 bytes×208 (=(172+10)×(192+16)) is divided into data of 16×182 bytes×1. As shown in FIG. 5, an interleaving operation is performed so that one line of outer code parity PO is added to each of 16 sector data 0 to 15 (each of which is composed of 182 bytes×12). After the encoding process has been performed with product code, data of (13 (=12+1)×182 bytes) including outer code parity PO is treated as data of one sector. A data unit treated as data of one sector is referred to as record sector. An interleave circuit 6 shown in FIG. 2 performs a process for adding one line of outer code parity PO to each of 12 lines of each sector.

Output data of the interleave circuit 6 is supplied to an 8-16 modulating circuit 7. In the 8-16 modulating process, eight bits of data are converted into 16 channel bits so as to decrease DC components of record data. The 8-16 modulating circuit 7 converts data of 182 bytes×208 shown in FIG. 5 into data of a transmission frame structure shown in FIG. 6. In other words, the 8-16 modulating circuit 7 divides 182 bytes of each line into two portions and outputs data of 208 (rows)×2 (frames).

Figure 6:
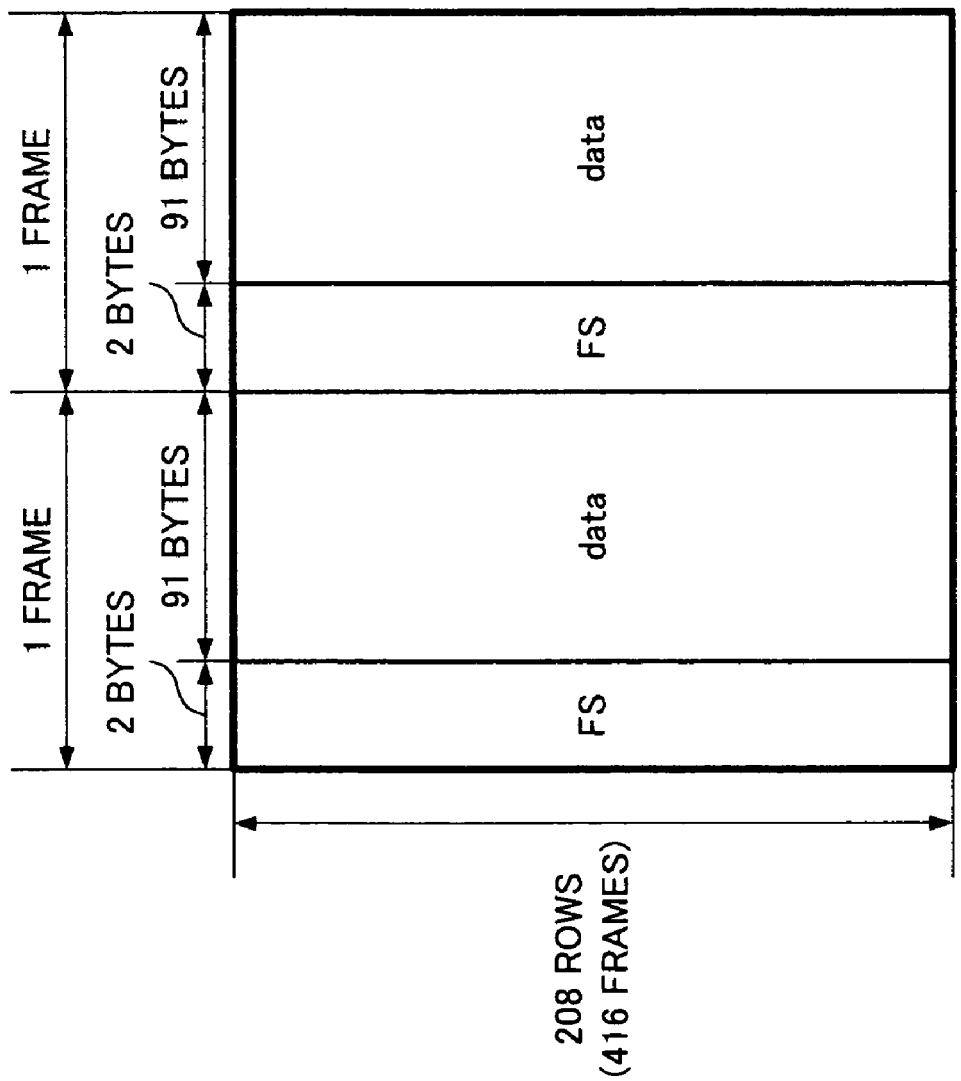
FIG. 6 is a schematic diagram for explaining the data structure of an ECC block that is transmitted according to the embodiment of the present invention.

A synchronization adding circuit 8 adds a frame synchronous signal (FS) of 2 bytes to the beginning of the frame data of 91 bytes. Thus, as shown in FIG. 6, data of one frame becomes data of 93 bytes. Thus, the resultant data becomes 208 (rows)×93×2 bytes (namely, data of 416 frames) that is data of one block as record/reproduction unit. The size of real data portion excluding the overhead portion becomes 32 K bytes (=2048×16/1024 K bytes).

FIG. 7 shows the structure of one record sector that has been modulated. The frame synchronous signal is compose of 32 channel bits. The data portion is composed of 1456 channel bits. As the frame synchronous signal, one of bit patterns SY0 to SY7 that are different each other is added. The frame synchronous signal (32 channel bits) and the data portion (1456 channel bits) compose a sync frame. An output signal of the synchronization adding circuit 8 is supplied to a disc drive 10 through a recording circuit 9 including a recording amplifier.

The disc drive 10 is composed of a semiconductor laser device, an optical pickup, a spindle motor, and so forth that are used to record data to for example a phase-change-optical disc as a DVD-RW disc. The semiconductor laser device is driven corresponding to record data supplied from the recording circuit 9. Data that is read from the disc by the optical pickup of the disc drive 10 is supplie to an RF circuit 11. The RF circuit 11 has a reproducing amplifier, and a calculating circuit, and so forth. The calculating circuit calculates a signal that is supplied from a divided detector disposed in the optical pickup. The RF circuit 11 generates error signals for tracking and focusing servo operations (not shown).

A reproduction (RF) signal is supplied from the RF circuit 11 to a synchronous detecting circuit 12. The synchronous detecting circuit 12 detects a frame synchronous signal. An 8-16 modulated data demodulating circuit 13 converts 16 channel bits into 8 data bits. Output data of the 8-16 modulated data demodulating circuit 13 is supplied to an inner code decoder 14. The inner code decoder 14 performs a decoding process with (182, 172, 11) Reed-Solomon code.

The inner code decoder 14 outputs error corrected data and an error flag that represents the presence/absence of an error. The data and the error flag that are output from the inner code decoder 14 are supplied to an deinterleaving circuit 15. The deinterleaving circuit 15 performs a process for separating outer code parity PO from each record sector. Output data of the deinterleaving circuit 15 is supplied to an outer code decoder 16. The outer code decoder 16 performs a decoding process with (208, 192, 17) Reed-Solomon code. The outer code decoder 16 calculates an error syndrome as an error correcting process, obtains an error position and an error value corresponding to the syndrome, and performs an error correcting process with the obtained error value. This process is referred to as error detecting and correcting process. In addition to the error detecting and correcting process or instead thereof, the outer code decoder 16 corrects an error with an error flag of inner code as an error position. This process is referred to as error erasing and correcting process.

Output data of the outer code decoder 16 is supplied to a sectoring circuit 17. The sectoring circuit 17 converts the reproduction data into data of sectors. Output data of the sectoring circuit 17 is supplied to an error detecting circuit 18. The error detecting circuit 18 detects the presence/absence of an error of each sector using error detection code (EDC) added to each sector. Output data of the error detecting circuit 18 is obtained from an output terminal 19. Output data obtained form the output terminal 19 is reproduction data that has been error corrected and an error flag that represents the presence/absence of an error of the reproduction data. When the error flag of a sector is set, data of the sector is invalid. Even if all the ECC block is error data, the error detecting circuit 18 can output data of each line unless the inner code error flag thereof is set (namely, the error flag represents an error).

According to the embodiment of the present invention, when contents data that has been encrypted for protecting the copyright thereof and copyright control information (such as a key) for decrypting the encrypted contents data are supplied from for example a DVD video player, the copyright control information is prohibited from being recorded. In contrast, data required for reproducing the contents data contained in the same ECC block as the copyright control information is permitted to be recorded. The data required to reproduce the contents data is management information necessary for reproducing the contents data that is read from a disc loaded in the DVD player. The management information represents for example the disc size, the number of record layers, the start sector, and the end sector. When the disc is loaded to the DVD player, the management information is initially read from the disc. Hereinafter, the information necessary for reproducing the contents data is referred to as physical format information. The physical format information includes the management information. According to the embodiment of the present invention, the copyright control information and the physical format information are contained in the same ECC block and recorded as one sector each. The physical format information is recorded in a record area on the immediately inner periphery of a record area for the contents data. The physical format information in the record area is read by the optical pickup before the contents data is reproduced from the record area.

To accomplish such a structure, a process for a writable disc such as a DVD-RW disc or a DVD-R disc is performed. In other words, as shown in FIG. 8, assuming that an n-th sector (record sector) is an area for the physical format information and an (n+2)-th sector is an area for the copyright control information, the (n+2)-th sector and at least one different sector are allocated as write prohibition areas. In the example shown in FIG. 8, the (n+2)-th sector and the (n+5)-th sector are allocated as write prohibition areas. In the case of a DVD video disc, the areas (record sectors) for the copyright control information and the physical format information are pre-allocated. When a block containing the copyright control information and the physical format information is repeatedly recorded (namely, multiply recorded), such write prohibition areas are formed for each block.

The write prohibition areas are formed as for example embossed areas on the surface of the disc. When a writable disc is fabricated, the areas corresponding to the (n+2)-th sector and the (n+5)-th sectors of the disc are embossed. Thus, these areas become write prohibition areas. Instead of embossed areas, dummy data may be recorded in the (n+2)-th sector and the (n+5)-th sector before the disc is shipped from the factory.

A block that contains the copyright control information and the physical format information has been encoded with error correction code. When only an area of one sector for the copyright control information is embossed, by the error erasing and correcting process with outer code (namely, (208, 192, 17) Reed-Solomon code), an error of up to 16 symbols can be corrected. Thus, the copyright control information can be restored. To prevent this problem, in addition to an area corresponding to a sector for the copyright control information, at least one different sector of the same ECC block is embossed.

In the above-described example, by the error detecting and correcting process, an error of up to eight symbols can be corrected. In the error correcting process for contents data to be reproduced, when only the error detecting and correcting process is performed without the error erasing and correcting process, only an area corresponding to one sector for the copyright control information is embossed. Instead of each record sector, each line may be embossed. In other words, when only the error detecting and correcting process is performed with outer code, 9 lines or more of a record sector for the copyright control information are embossed. In contrast, when the error erasing and correcting process is performed with outer code, 4 lines or more are embossed along with the record sector (13 lines) (or 5 lines or more along with the sector (12 lines) excluding the parity line).

When areas of a plurality of sectors are embossed, since data cannot be reproduced therefrom, contents data may not be synchronously reproduced. To prevent such a problem, a plurality of write prohibition areas are formed at intervals of a predetermined sectors or lines necessary for synchronously reproducing the contents data. Since one record sector is composed of 13 lines as shown in FIG. 5, 4 lines or more of another sector (n+5) are embossed along with one sector (n+2) so as to form write prohibition areas.

In the case that a digital output signal of a DVD video player is recorded to a disc having such an embossed area and the digital signal is reproduced from the disc by a DVD-RW recorder, a conventional DVD video player, or the like, when the disc is loaded to the player, areas for the copyright control information and the physical format information are read from the disc. When the error correcting process is performed for data of a reproduced block, data of all the block is detected as an error. However, since the error detecting circuit 18 can output data of each line unless the error flag thereof is set, the physical format information can be output. A sector for the copyright control information is substituted with predetermined data such as data of all "0s".

The disc size, the number of record layers, the start sector, and the end sector of the reproduced physical format information are read to the controller of the player. The contents data is reproduced from the disc corresponding to the physical format information. Thus, when contents data recorded on the disc has been encrypted for the copyright protection, since the copyright control information cannot be reproduced, the contents data cannot be decrypted. On the other hand, contents data that has not been encrypted can be reproduced corresponding to the physical format information that is read corresponding to the physical format information by a DVD-RW recorder or a conventional DVD video player.

When digital data other than digital output data of a DVD video player is recorded on a DVD-RW disc, as with the physical format information, the position of information necessary for reproducing contents data may not match that of a DVD video disc. In other words, such information may be recorded at another position.

Thus, when a record area for the copyright control information is pre-allocated as a write prohibition area, even if encrypted data for copyright protection and copyright control information as a key for decrypting the encrypted data are tried to be recorded to a disc, the copyright control information cannot be recorded. Consequently, a picture such as a movie cannot be reproduced from the encrypted data. As a result, the copyright of the contents data can be protected. On the other hand, in the case of contents data that does not require the copyright protection, since the physical format information can be recorded, the contents data can be reproduced corresponding to the physical format information reproduced by a DVD-RW recorder or a DVD video player.

In addition, there is a problem to be considered against the copyright protection. Even if such a disc having an embossed area is defined as a standard disc, countermeasures against a non-standard disc that does not have an embossed area should be considered. With such a non-standard disc, the copyright control information can be recorded and thereby encrypted contents data can be reproduced. To solve such a problem, according to the embodiment of the present invention, a particular signal process independent from a storing medium is performed in such a manner that although the physical format information can be obtained, the copyright control information cannot be properly obtained.

Mainly, there are two methods that cause the copyright control information not to be properly obtained. As a first method, a process for causing a player to improperly read the copyright control information is performed. As a second method, a process for causing a player not to read the copyright control information is performed. In the first method, the copyright control information or data of a sector that contains the copyright control information is substituted with different data. With the different data, inner code parity PI and outer code parity PO are generated. As a method for generating different data, the copyright control information may be scrambled. Alternatively, "0" and "1" of the data of the copyright control information may be inverted. Alternatively, the copyright information may be added by another data. Alternatively, the data of the copyright control information may be substituted with all "0s".

Since the copyright control information is converted into different data and then the data is encoded with error correction code, when contents data is reproduced, an error cannot be detected by an error correcting process. Thus, different data may be detected as copyright control information. Thus, when data is recorded or reproduced, even if an error that takes place is corrected, the correct copyright control information cannot be restored. As a result, the copyright control information cannot be correctly obtained.

As the second method, the copyright control information cannot be restored by an error correcting process. The converted data generating circuit 20 according to the embodiment of the present invention accomplishes the second method. In this example, an error correction performance of product code of which an encoding process is performed with inner code in the line direction and an encoding process is performed with outer code in the column direction as shown in FIG. 4 will be described. When product code is decoded, an error is corrected with inner code in the data arrangement direction of recorded data. A correctable error is corrected and a line with an non-correctable error is represented with an error flag. Thereafter, an error is corrected with outer code. In other words, an error syndrome is calculated. With the syndrome, the error position and the error value are obtained. With the obtained error value, the error is corrected (namely, the error detecting and correcting process is performed). In the outer code decoder, with reference to an error flag obtained with inner code, the error erasing and correcting process can be performed along with the error detecting and correcting process or instead thereof.

Generally, the minimum distance d of code that allows an error of up to "t" symbols to be detected and corrected satisfies the relation of (d≧2t+1). In addition, the minimum distance d of code that allows an error of up to "t" symbols to be corrected by the error erasing and correcting process satisfies the relation of (d≧t+1). With the above-described (208, 192, 17) Reed-Solomon code (outer code), since the minimum distance d is 17, an error of up to 8 symbols can be corrected by the error detecting and correcting process. In addition, an error of up to 16 symbols can be corrected by the error erasing and correcting process.

Thus, in the case that the minimum distance of outer code is "d", if an error of "a" lines that is not erased with inner code and detected with outer code or that is erased with inner code and not used and an error of "b" lines is erased with inner code, when the relation of 2a+b≧d (b≧d when a=0) is satisfied, the error cannot be corrected with outer code. Thus, to prevent the copyright control information from being corrected and restored with error correction code, "a" and "b" are intentionally generated so as to satisfy the relation of the above-mentioned inequality. To reproduce the physical format information, it is necessary to cause it not to be contained in (2a+b) lines.

To intentionally create the "a" lines, the converted data generating circuit 20 encodes data of the "a" lines that is non-zero data with inner code and generates inner code parity PI. From the data of the "a" lines and the parity PI, an error cannot be detected with inner code. After the outer code encoder 5 has performed the outer code encoding process and generated an ECC block shown in FIG. 4, the data of the "a" lines and the converted data thereof are combined. As was described above, the "a" lines are an area that contains the copyright control information, not the physical format information.

As the combining method, the original data and the converted data may be exclusively ORed. Alternatively, the original data may be substituted with the converted data. Assuming that an error does not take place in data that is recorded or reproduced, when the converted data is reproduced, although an error is not detected in the inner code decoding process, an error is detected in the outer code decoding process.

To intentionally create the "b" lines, the converted data generating circuit 20 generates error data (of the "b" lines) that cannot be corrected with inner code. After the outer code encoder 5 has performed the outer code encoding process and generated an ECC block shown in FIG. 4, the data of the "b" lines and the generated error data thereof are combined. As the combining method, the original data and the error data may be exclusively ORed. Alternatively, the original data may be substituted with the error data. As was described above, the "b" lines are an area that contains the copyright control information, not the physical format information.

Instead of such a combining process, after an ECC block has been generated, the data of the "b" lines may be substituted with different data. In other words, part or all bits of each of the "b" lines are inverted. In addition, while an ECC block is being generated, the data of the "b" lines and false data are exclusively ORed. After the inner code encoding process is performed, the false data can be removed. In this case, when contents data is reproduced, the "b" lines are always detected as an error with inner code.

Likewise, after the error correction encoding process is completed, data (a plurality of columns) from which an error cannot be detected with outer code may be exclusively ORed. Alternatively, error data from which an error can be detected with outer code may be exclusively ORed. Thus, an error of a block cannot be corrected.

In the case of a DVD-RW disc, data cannot be read from an embossed area. Thus, regardless of a bit pattern of the embossed area, data that is read from such an embossed area becomes an error. However, to more securely protect the copyright, a case of which data can be read from an embossed area should be considered.

When data can be read from an embossed area, a bit pattern (data) of the embossed area should satisfy the relation of (2a+b≧d). In other words, as data of "b" lines, error data that cannot be corrected with inner code is formed as an embossed area. As data of "a" lines, data that cannot be detected as an error with inner code is combined. The combined data is formed as a embossed area.

When the copyright control information is tried to be recorded along with contents data, the copyright control information is forcedly substituted with data of embossed pits. With this data, the error correction code encoding process may be performed. Thus, although a block that contains the copyright control information does not have an error, even if the copyright control information is tried to be illegally recorded, it cannot be recorded.

According to the above-described embodiment, the present invention is applied to a DVD. However, it should be noted that the present invention can be applied to other optical discs. In addition, the present invention can be also applied to a hard disk, a semiconductor memory card, an optical card, and so forth.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A data storing medium, comprising:
   a digital data area in which one of encrypted digital data and non encrypted digital data is written;
   a control data area in which control data necessary for reproducing recorded digital data is written; and
   a plurality of copyright control information areas in which is written the same copyright control information necessary for decrypting the encrypted digital data,
   wherein said plurality of copyright control information areas are spaced apart by a predetermined interval,
   wherein said plurality of copyright control information areas are embossed so as to be write prohibited,
   wherein said control data area is write permitted,
   wherein, data written to the area for the copyright control information is converted so that the data is not corrected by an error correcting process performed when the encrypted digital data is reproduced, and
   wherein a data converting process converting the copyright control information is a process that satisfies a relation of 2a+b>d where "a" is a number of lines that are not erased as an error of the copyright control information, "b" is a number of lines that are erased thereof, and "d" is a minimum distance of the error correction code.

2. The data storing medium as set forth in claim 1,
   wherein an entire sector containing the control data area for the control data is write permitted.

3. The data storing medium as set forth in claim 1,
   wherein an entire sector containing the copyright control information area for the copyright control is write prohibited.

4. The data storing medium as set forth in claim 1,
   wherein the storing medium is a recordable medium.

5. The data storing medium as set forth in claim 1,
   wherein data that is different from the copyright control information and that is not detected as an error with error correction code is recorded.

6. The data storing medium as set forth in claim 1,
   wherein the data written in the digital data area has been modulated corresponding to 8-16 modulating method.

7. A data recording apparatus for writing encrypted digital data to a data storing medium, comprising:
   means for writing the encrypted digital data and copyright control information for decrypting the encrypted digital data to the data storing medium so that when the encrypted digital data is reproduced the copyright control information is not obtained by recording dummy information in a sector of the data storing medium, so as to form a write-prohibited area containing the copyright control information; and
   means for encoding the copyright control information with an error correcting code,
   wherein, data written to the area for the copyright control information is converted so that the data is not corrected by an error correcting process performed when the encrypted digital data is reproduced, and
   wherein a data converting process converting the copyright control information is a process that satisfies a relation of 2a+b>d where "a" is a number of lines that are not erased as an error of the copyright control information, "b" is a number of lines that are erased thereof, and "d" is a minimum distance of the error correction code.

8. The data recording apparatus as set forth in claim 7,
   wherein the error correcting process is an error detecting and correcting process.

9. The data recording apparatus as set forth in claim 7,
   wherein the error correcting process is an error erasing and correcting process.

10. The data recording apparatus as set forth in claim 7,
    wherein a data converting process converting the copyright control information is a process for exclusively ORing the copyright control information and different data, encoding the resultant data with error detection and/or correction code, and removing the different data.

11. The data recording apparatus as set forth in claim 7,
    wherein the encrypted digital data has been modulated corresponding to an 8-16 modulating method.

12. A data writing method for a data storing medium having a first area in which digital data is written and a second area in which control data necessary for reproducing the data from the first area is written, the data writing method comprising the step of:
    writing the control data to the second area in such a manner that part of the control data is not reproduced,
    wherein the control data written in the second area contains copyright control data about the digital data written in the first area, and
    causing the copyright control data to be written in the second area in such a manner that the copyright control data is reproduction-prohibited
    wherein the copyright control data includes an error correction code and is converted in such a manner that a relation of 2a+b>d is satisfied where "a" is a number of lines that are not erased as an error of the copyright control data, "b" is a number of lines that are erased thereof, and "d" is a minimum distance of the error correction code.

13. The data writing method as set forth in claim 12, wherein the copyright control information is reproduction-prohibited by exclusively ORing the copyright control information and different data, encoding the resultant data with error detection and/or correction code, and removing the different data.

14. A data writing method for a data storing medium having a first area in which digital data is written and a second area in which different data is written that is to be read before the digital data is read when the digital data is reproduced, the data writing method comprising the steps of:
converting the different data in such a manner that the different data is not corrected by an error correcting process; and
writing the different data to the second area in such a manner that part of the different data is not reproduced
wherein the different data is converted in such a manner that a relation of 2a+b>d is satisfied where "a" is a number of lines that are not erased as an error of the different data, "b" is a number of lines that are erased thereof, and "d" is a minimum distance of a error correction code used in the error correcting process.

15. The data writing method as set forth in claim 14, wherein the different data is written to the second area in such a manner that the different data is reproduction-prohibited.

16. The data writing method as set forth in claim 14, wherein the different data comprises copyright control information and is converted by exclusively ORing the copyright control information and false data, encoding resultant data with an error detection and/or correction code, and removing the false data.

17. The data writing method as set forth in claim 14, wherein the digital data written to the first area is encrypted data.

18. The data writing method as set forth in claim 14, wherein the different data that is written to the second area is data containing copyright control data about the digital data that is written to the first area.

19. A data writing apparatus having a data storing medium having a first area in which digital data is written and a second area in which control data necessary for reproducing the data from the first area is written, the data writing apparatus comprising:
a writing portion for writing data to the data storing medium; and
a data processing portion for supplying data to said writing portion in such a manner that a part of the control data comprising copyright control data is reproduction-prohibited,
wherein said data processing portion converts the copyright control data of the control data in such a manner that the copyright control data is not corrected by an error correcting process,
wherein said data processing portion converts the copyright control data in such a manner that a relation of 2a+b>d is satisfied, where "a" is a number of lines that are not erased as an error of the copyright control data, "b" is a number of lines that are erased thereof, and "d" is a minimum distance of an error correction code used in the error correcting process.

20. The data writing apparatus as set forth in claim 19, wherein said data processing portion exclusively OR's the copyright control information and different data, encodes the resultant data with error detection and/or correction code, and removes the different data.

21. A data writing apparatus for a data storing medium having a first area in which digital data is written and a second area in which different data that is read before the digital data is read from the first area when the digital data is reproduced from the first area, the data writing apparatus comprising:
a writing portion for writing data to the data storing medium; and
a data processing portion for supplying data to said writing portion in such a manner that at least part of the different data comprising copyright control data is reproduction-prohibited,
wherein said data processing portion converts the different data in such a manner that the different data is not corrected by an error correcting process, and
wherein said data processing portion converts the copyright control data in such a manner that a relation of 2a+b>d is satisfied where "a" is a number of lines that are not erased as an error of the copyright control data, "b" is a number of lines that are erased thereof, and "d" is a minimum distance of a error correction code that is used in the error correcting process.

22. The data writing apparatus as set forth in claim 21, wherein said data processing portion exclusively OR's the different data and other data, encodes the calculated result with error detection and/or correction code, and performs a process for removing the other data from the encoded data.

* * * * *